United States Patent
Hofmann et al.

(10) Patent No.: US 8,572,818 B2
(45) Date of Patent: Nov. 5, 2013

(54) CONNECTING ASSEMBLY FOR FASTENING AN ADD-ON ELEMENT ON A CARRIER

(75) Inventors: Juergen Hofmann, Eisenberg (DE); Hubert Loewe, Weselberg (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 46 days.

(21) Appl. No.: 12/993,107

(22) PCT Filed: May 20, 2009

(86) PCT No.: PCT/EP2009/003606
§ 371 (c)(1),
(2), (4) Date: Feb. 1, 2011

(87) PCT Pub. No.: WO2009/141138
PCT Pub. Date: Nov. 26, 2009

(65) Prior Publication Data
US 2011/0113598 A1  May 19, 2011

(30) Foreign Application Priority Data
May 23, 2008 (DE) .................... 20 2008 006 958 U

(51) Int. Cl.
*F16B 19/04* (2006.01)
(52) U.S. Cl.
USPC .............. 24/458; 24/297; 24/453; 24/581.11; 411/45; 411/48
(58) Field of Classification Search
USPC ............ 24/297, 453, 458, 581.11; 411/45, 48
See application file for complete search history.

(56) References Cited

U.S. PATENT DOCUMENTS

| | | | | |
|---|---|---|---|---|
| 3,116,528 A | * | 1/1964 | Poe ................................. | 411/15 |
| 3,407,454 A | * | 10/1968 | Myatt ........................... | 411/549 |
| 3,550,498 A | * | 12/1970 | Briles ............................ | 411/432 |
| 4,122,583 A | * | 10/1978 | Grittner et al. ................ | 24/703.1 |
| 4,375,342 A | * | 3/1983 | Wollar et al. .................... | 411/41 |
| 4,403,377 A | * | 9/1983 | Mizusawa ........................ | 24/681 |
| 4,579,492 A | * | 4/1986 | Kazino et al. ................. | 411/80.1 |
| 4,716,633 A | * | 1/1988 | Rizo ................................ | 24/453 |
| 4,840,523 A | * | 6/1989 | Oshida ............................ | 411/48 |
| 4,874,276 A | * | 10/1989 | Iguchi ............................. | 411/48 |

(Continued)

FOREIGN PATENT DOCUMENTS

| | | |
|---|---|---|
| CN | 1854540 | 4/2006 |
| DE | 20017376 | 3/2001 |

(Continued)

*Primary Examiner* — Robert J Sandy
*Assistant Examiner* — David Upchurch
(74) *Attorney, Agent, or Firm* — Tarolli, Sundheim, Covell & Tummino LLP

(57) ABSTRACT

A connection assembly for fastening an attaching element on a support (10) comprises a holding clip (16), which can be inserted into a mounting opening (20) of the support (10) and has holders (54) for axially fixing the holding clip (16) to the support (10), and a pin (12), which can be reversibly attached to a coupling piece (14) fastened to the attachment element and inserted into the holding clip (16). The pull-off force of the pin (12) in an intermediate position of the connecting assembly, in which the pin (12) has a first orientation relative to the holding clip (16), is larger than in a mounting position of the connection assembly, in which the pin (12) also has the first orientation and is inserted fully into the holding clip (16).

10 Claims, 5 Drawing Sheets

Fig. 1

(56) References Cited

U.S. PATENT DOCUMENTS

| | | | |
|---|---|---|---|
| 4,952,106 A * | 8/1990 | Kubogochi et al. | 411/48 |
| 5,085,545 A * | 2/1992 | Takahashi | 411/45 |
| 5,201,623 A * | 4/1993 | Benedetti et al. | 411/48 |
| 5,211,519 A * | 5/1993 | Saito | 411/45 |
| 5,632,581 A * | 5/1997 | Hasada | 411/48 |
| 5,641,255 A * | 6/1997 | Tanaka | 411/48 |
| 6,196,607 B1 * | 3/2001 | Gulisano | 296/39.1 |
| 6,264,393 B1 * | 7/2001 | Kraus | 403/282 |
| 6,726,417 B2 * | 4/2004 | Kanie | 411/48 |
| 7,033,121 B2 * | 4/2006 | Kirchen | 411/48 |
| 7,213,378 B2 * | 5/2007 | Randez Perez et al. | 52/704 |
| 7,237,995 B2 * | 7/2007 | Randez Perez et al. | 411/45 |
| 7,249,922 B2 * | 7/2007 | Yoneoka | 411/45 |
| 2002/0026693 A1 * | 3/2002 | Akema et al. | 24/453 |
| 2003/0143053 A1 * | 7/2003 | Kanie | 411/45 |
| 2004/0052609 A1 | 3/2004 | Kraus | |
| 2005/0123372 A1 * | 6/2005 | Sato | 411/32 |
| 2006/0261695 A1 | 11/2006 | Terrill et al. | |
| 2008/0201920 A1 | 8/2008 | Jatzke | |
| 2008/0219758 A1 | 9/2008 | Jatzke | |

FOREIGN PATENT DOCUMENTS

| | | |
|---|---|---|
| DE | 202007002071 | 7/2007 |
| DE | 202007002595 | 10/2007 |
| EP | 1323932 | 7/2003 |
| EP | 1630426 | 3/2006 |
| EP | 1717458 | 11/2006 |
| WO | 0230710 | 4/2002 |

* cited by examiner

CONNECTING ASSEMBLY FOR FASTENING AN ADD-ON ELEMENT ON A CARRIER

RELATED APPLICATION

This application corresponds to PCT/EP2009/003606, filed May 20, 2009, which claims the benefit of German Patent Application No. 20 2008 006 958.9, filed May 23, 2008, the subject matter of which is incorporated herein by reference.

The present invention relates to a connecting assembly for fastening an add-on element on a carrier, in particular for fastening a door lining to a door panel of a motor vehicle.

Traditional connecting assemblies do not fully withstand high removal forces. In this context, the term removal force is intended to mean the maximum force directed contrary to the mounting direction of the add-on element which the connecting assembly is able to resist before the add-on element can no longer be held on the carrier. Where especially high removal forces are prescribed, conventional screw connections are therefore still considered which, however, involve time-consuming mounting and dismounting.

It is the object of the invention to avoid the disadvantages of a screw connection and to provide a cost-effective connecting assembly which is capable of withstanding extremely high removal forces while still ensuring a reversible attachment of the add-on element on the carrier.

The object is achieved by a connecting assembly having the features of claim 1. Advantageous and useful further developments of the connecting assembly according to the invention will be apparent from the dependent claims.

The connecting assembly according to the invention for fastening an add-on element on a carrier includes a holding clip which can be inserted into a mounting opening of the carrier and has holding means for axially locating the holding clip on the carrier, and a pin which can be reversibly fitted to a coupling part fastened to the add-on element and can be inserted into the holding clip, the removal force of the pin being larger in an intermediate position of the connecting assembly, in which the pin has a first orientation relative to the holding clip and is not completely inserted in the holding clip, than in a mounting position of the connecting assembly, in which the pin likewise has the first orientation and is completely inserted in the holding clip.

connecting assembly, in which the pin likewise has the first orientation and is completely inserted in the holding clip.

Since the pin of the connecting assembly according to the invention has the same orientation in both the intermediate position and the mounting position, any rotating or the like of the pin, which would render mounting more difficult, is not required during the mounting of the connecting assembly. Furthermore, the invention follows the idea that it is not required to separate the pin completely from the holding clip for dismounting the add-on element. The pin and the holding clip are adjusted to each other such that, proceeding from the mounting position of the connecting assembly, the pin may be withdrawn into an intermediate position when applying a comparatively small amount of force which, however, is still larger than the forces occurring under usual vehicle driving conditions; in this intermediate position, it is then impossible to completely remove the pin even in case of an action of very much larger forces. This ensures that after being mounted the add-on element can still be dismounted (without destroying one or more components of the connecting assembly) while it is impossible for the add-on element to become detached from the carrier in an undesirable manner even under extreme conditions.

In accordance with the preferred embodiment of the connecting assembly according to the invention, the pin or the holding clip includes first retaining means which in the intermediate position cooperate with complementary retaining means of the holding clip or of the pin. The first retaining means are preferably formed on the pin as undercuts having holding surfaces that are oriented substantially perpendicularly to the longitudinal axis of the pin.

A further development of the present invention makes provision that in the intermediate position the pin can be transferred to a second orientation which is different from the first orientation and in which the first retaining means no longer cooperate with the complementary retaining means. This allows—after a transfer of the connecting assembly from the mounting position to the intermediate position—the pin to be subsequently removed from the holding clip, for instance in the event the pin is to be exchanged.

Mounting of the connecting assembly may be simplified in that the pin and the coupling part that is fastened to the add-on element include orientation prescribing means that match each other and prescribe a specific orientation of the pin.

Likewise, the holding clip and the carrier may include orientation prescribing means that match each other and prescribe the second orientation of the holding clip. In conjunction with the orientation prescribing means of the pin and of the coupling member, in this way the first orientation of the pin relative to the holding clip, in which the first and second retaining means, respectively, cooperate with the complementary retaining means, may be forced in a particularly advantageous manner, so that any incorrect mounting is ruled out.

A seal that is preassembled on or integrally injection-molded with the holding clip to seal off the mounting opening and/or a guide channel of the holding clip into which the pin can be inserted, is also of advantage.

Further features and advantages of the invention will become apparent from the description below and from the accompanying drawings, to which reference is made and in which.

Figure 1:
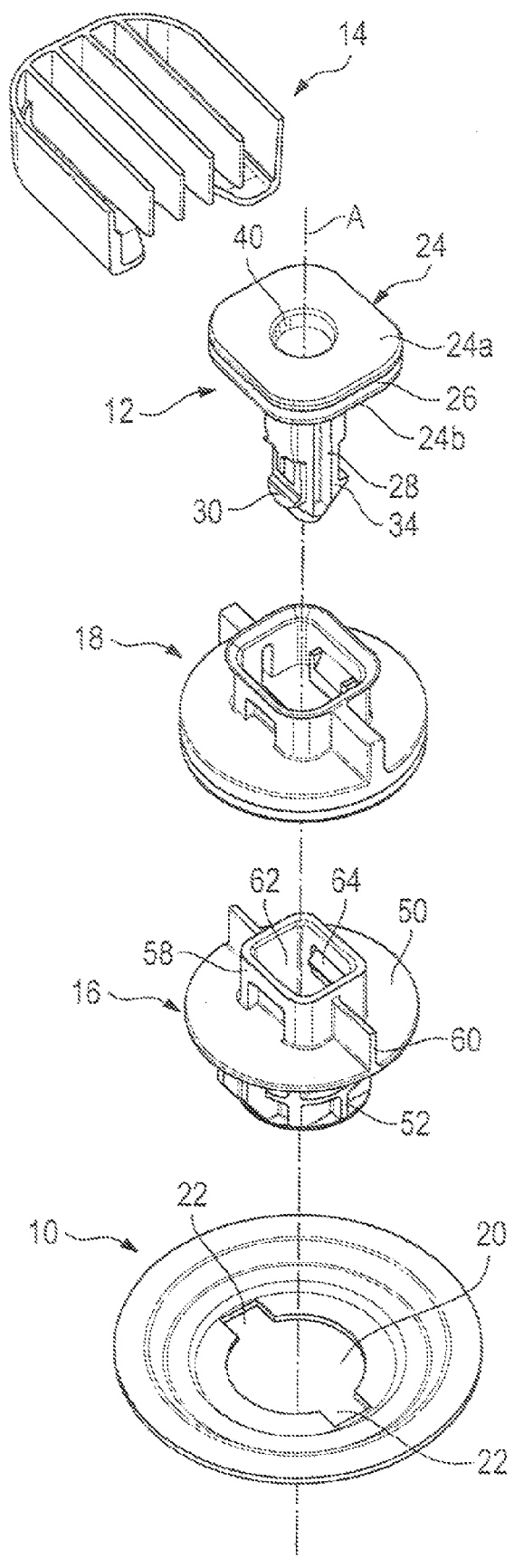
FIG. 1 shows a perspective top view of the components of a connecting assembly.
Figure 2:
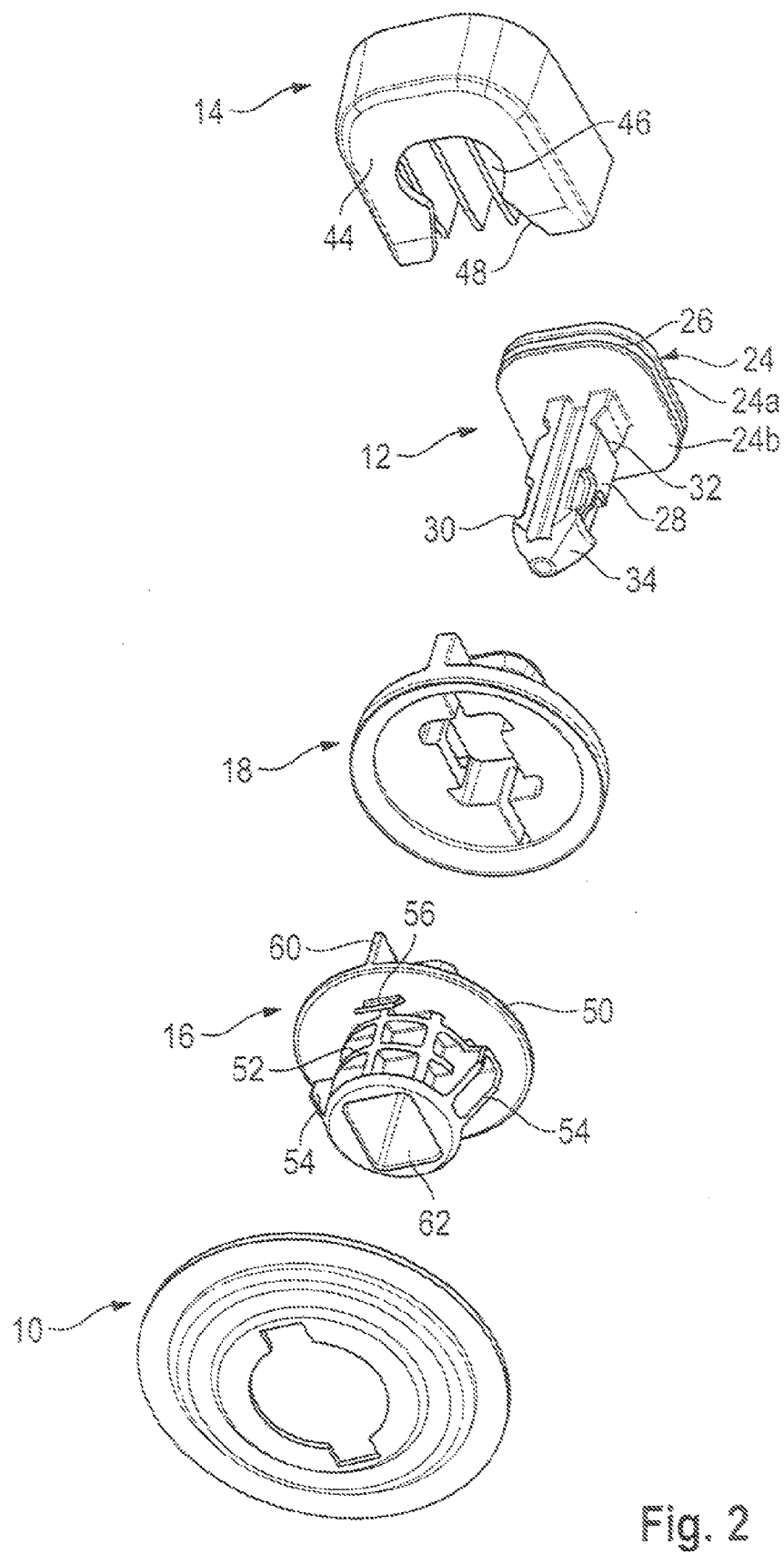
FIG. 2 shows a perspective bottom view of the components from FIG. 1.

FIGS. 1 and 2 show each component of a connecting assembly for fastening an add-on element on a carrier 10 individually, the orientation of the components corresponding to that in the mounted condition of the connecting assembly. The structure of the components and how they cooperate will be described in the following, taking the fastening of a door lining to a door panel of a motor vehicle as an example. The invention is, however, not limited to this application, but may also be made use of for other purposes.

The connecting assembly includes a pin 12 made of a hard synthetic material, preferably POM C (polyoxymethylene copolymer), a coupling part 14 (retainer), a holding clip 16 made of a hard synthetic material, preferably GF PBT (glass fiber reinforced polybutylene terephthalate), and an optional seal 18 made of an elastic synthetic material, preferably TPE V (vulcanized thermoplastic elastomer). The connecting assembly is provided to connect an add-on element (door lining) fastened to the coupling part 14 to a carrier 10 (door panel) provided with a mounting opening 20.

The carrier 10 and the holding clip 16 include orientation prescribing means that match each other to prescribe a specific orientation of the holding clip 16 relative to the carrier 10 when the holding clip 16 is fastened to the carrier 10. In the present case the mounting opening 20 is circular, but has rectangular recesses (extensions) 22 at two diametrically opposed locations. The associated orientation prescribing means of the holding clip 16 will be described further below. The coupling part 14 and the pin 12 likewise have orientation prescribing means that match each other and that are in the form of specific geometric designs, allowing the pin 12 to be fitted to the coupling part 14 only in a particular orientation of the pin 12 in relation to the coupling part 14.

The pin 12 has a flat, oblong head 24 that is substantially rectangular, but not square. A circumferentially surrounding groove 26 divides the head 24 into an upper part 24a and a lower part 24b. Extending from the lower part 24b of the head 24 is an oblong shank 28 having a substantially cuboid base body defining a longitudinal axis A.

The pin 12 includes first retaining means 30 and second retaining means 32. Both retaining means 30, 32 are each formed on opposite sides of the base body. The first retaining means 30 are in the form of undercuts of the conically tapered shaft end 34 facing away from the head 24 and have holding surfaces 36 that are oriented substantially perpendicularly to the axis A (see also FIGS. 4 and 6). The second retaining means 32 are in the form of notches having ramps 38 that are inclined in relation to the axis A (see also FIGS. 3 and 4). On the side facing away from the shank 28, the head 24 is optionally provided with a seat 40 for receiving a screwdriving tool.

The coupling part 14 has an engagement region with a substantially rectangular pocket 42 (see FIG. 3) that is adjusted to the shape of the upper head part 24a of the pin 12. The pocket 42 is open on one side and has in a flat axial end wall 44 an opening 46 and an insertion slot 48 conically tapered towards the opening. Since both the head 24 (and also the rest of the pin 12) and the engagement region (and also the rest of the coupling part 14) are made to be mirror-symmetrical, the upper head part 24a of the pin 12 can be inserted into the pocket 42 of the coupling part 14 in exactly two angular positions with respect to the axis A. Since these two angular positions are 180 degrees apart and owing to the symmetry, the geometric relationships are identical in these two angular positions, both angular positions are combined to constitute a first orientation of the pin 12.

Provision may also be made for different orientation prescribing means which allow the pin 12 to be fitted to the coupling part 14—more specifically, insertion of the pin 12 into the coupling part 14 or slipping the coupling part 14 onto the pin 12—only in the first orientation of the pin 12 relative to the coupling part 14, e.g. an appropriate adjustment of the edges of the end wall 44 engaging into the groove 26 of the pin 12 to the shape of the groove 26. For the mirror-symmetrical pin 12, in conformity with the definition of the first orientation, those two angular positions which are reached after a respective rotation through 90 degrees relative to the first angular positions are referred to as second orientation of the pin 12 in combination.

The holding clip 16 includes a disk-like flange 50. A first structure 52 having a maximum outside diameter that is slightly smaller than the diameter of the mounting opening 20 (without the extensions 22) in the carrier 10 extends from that axial side of the flange 50 which in the mounted condition of the connecting assembly faces the mounting opening 20 of the carrier 10 (lower side). Further provided are holding means 54 in the form of a pair of diametrically opposed, symmetrically arranged structural sections which are integrally molded with the first structure 52 in the radial direction and therefore project radially from the rest of the first structure 52. The holding means 54 have an axial distance from the flange 50 which roughly corresponds to the thickness of the rim region of the carrier 10 surrounding the mounting opening 20. As the axial distance from the flange 50 increases, the holding means 54 taper as far as to the outside diameter of the rest of the first structure 52. The width of the holding means 54 is slightly smaller than that of the rectangular extensions 22 of the mounting opening 20. Orientation prescribing means in the form of a pair of latching tongues 56 are provided on the lower side of the flange 50, each offset by 90 degrees in relation to the holding means 54, the width of the latching tongues 56 being likewise adjusted to the extensions 22 of the mounting opening 20.

A substantially rectangular second structure 58 and a pair of diametrically opposed wall sections 60, which serve as a turning aid, extend on the other axial side of the flange 50, which in the mounted condition faces away from the carrier 10 (top side). A guide channel 62 having a substantially rectangular cross-section traverses the two structures 52, 58 and the flange 50. Retaining means 64 in the form of latching projections are formed in the guide channel 62 on two opposite inner wall sections of the second structure 58, the retaining means 64 being complementary to the first and second retaining means 30, 32 of the pin 12 and being elastically deformable and pivotal in the radial direction.

The seal 18 is complementary to the top side of the holding clip 16 facing away from the carrier 10; to put it more precisely, it forms a covering for the top side of the flange 50, the second structure 58 and the two wall sections 60. The seal 18 is either preassembled on the holding clip 16 or directly integrally injection-molded therewith in a two-component injection-molding process. The seal 18, which acts in both axial directions, is not a necessary, but a useful component of the connecting assembly, especially if the mounting opening 20 in the carrier 10 and the guide channel 62 of the holding clip 16 are intended to be sealed from the pin 12.

To connect the add-on element with the carrier 10, on the one hand the holding clip 16 is fastened to the carrier 10 and on the other hand the pin 12 is mounted to the coupling part 14 fastened to the add-on element, before the pin 12 is then pressed into the holding clip 16.

Owing to the holding means 54 (projecting structural sections), the holding clip 16 may only be inserted into the mounting opening 20 of the carrier 10 with respect to the axis A in two angular positions which are spaced apart 180 degrees and are combined as the first orientation of the holding clip 16. The holding clip 16 is introduced so far until the flange 50 rests on the rim region of the carrier 10 surrounding the mounting opening 20. Then the holding clip 16 is rotated through 90 degrees clockwise or anticlockwise, with the easily accessible turning aid in the form of the two wall sections 60 facilitating the turning action, until the orientation prescribing means 56 of the holding clip 16 snap into the extensions 22 of the mounting opening 20 to lock the holding clip 16 against further rotation. In this second orientation of the holding clip 16, which is shown in FIGS. 3 to 7, the holding means 54 engage behind the rim of the mounting opening 20, so that the holding clip 16 can not be withdrawn from the carrier 10. The seal 18 ensures that dirt or moisture are prevented from penetrating through the mounting opening 20 and into the interior of the vehicle.

Figure 3:
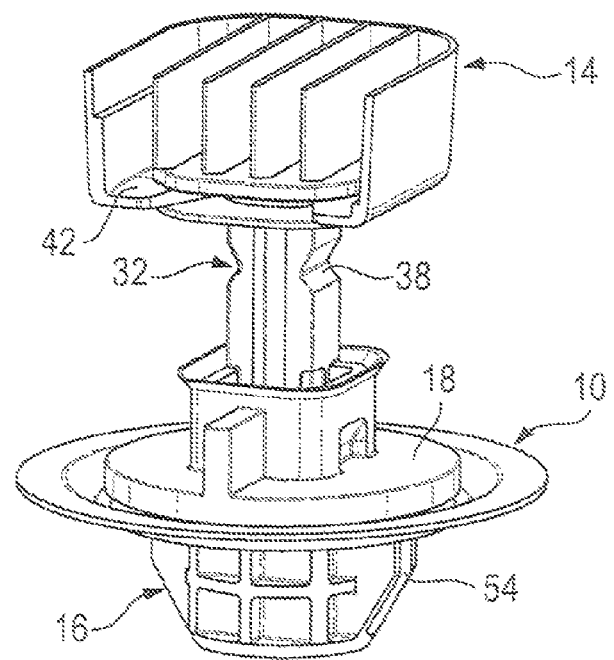
FIG. 3 shows a perspective view of the connecting assembly in the intermediate position.
Figure 4:
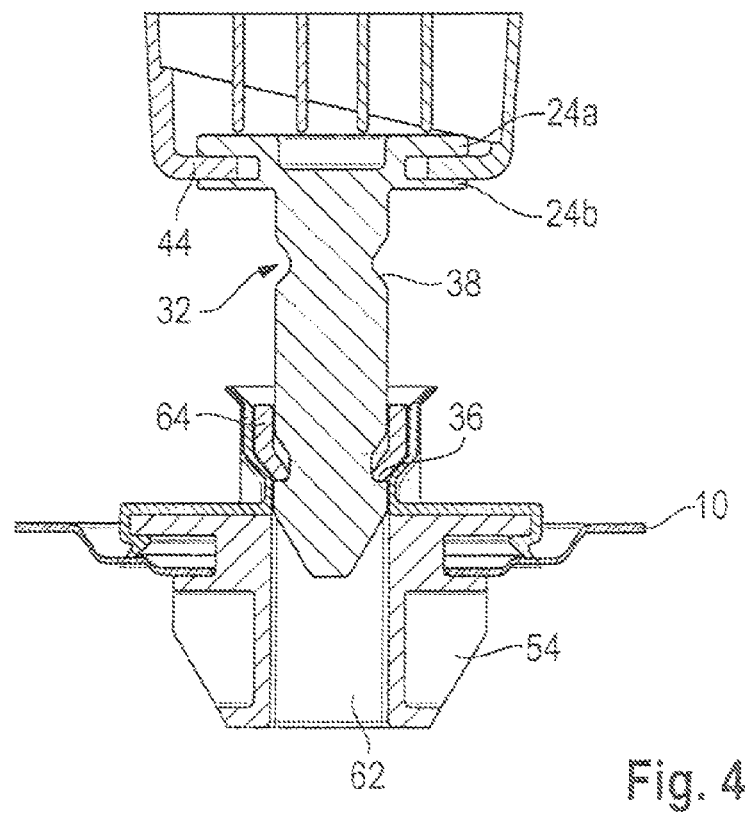
FIG. 4 shows a lateral sectional view of the connecting assembly in the intermediate position.

FIGS. 3 and 4 also show the pin 12 as fitted to the coupling part 14. In accordance with the preferred use of the connecting assembly, the coupling part 14 is fastened to the door lining such that the pocket 42 is open towards the top (in the vertical direction of the vehicle=z direction) and the opening 46 faces the door panel (carrier 10). The upper head part 24a of the pin 12 is inserted in the pocket 42 of the engagement region. It can be seen that the edges of the end wall 44, which define the insertion slot 48 and the opening 46, engage into the groove 26 of the pin 12, i.e. the upper head part 24a is situated in the pocket 42 while the lower head part 24b lies against the end wall 44 of the coupling part 14 on the outside. As already mentioned above, due to the matching shapes of the pocket 42 and the head 24, the pin 12 can only be inserted in its first orientation. Accordingly, the installation position of the add-on element with the coupling part 14 fastened thereto determines the orientation of the pin 12 in relation to the holding clip 16 fastened to the mounting opening 20 of the carrier 10.

Figure 5:
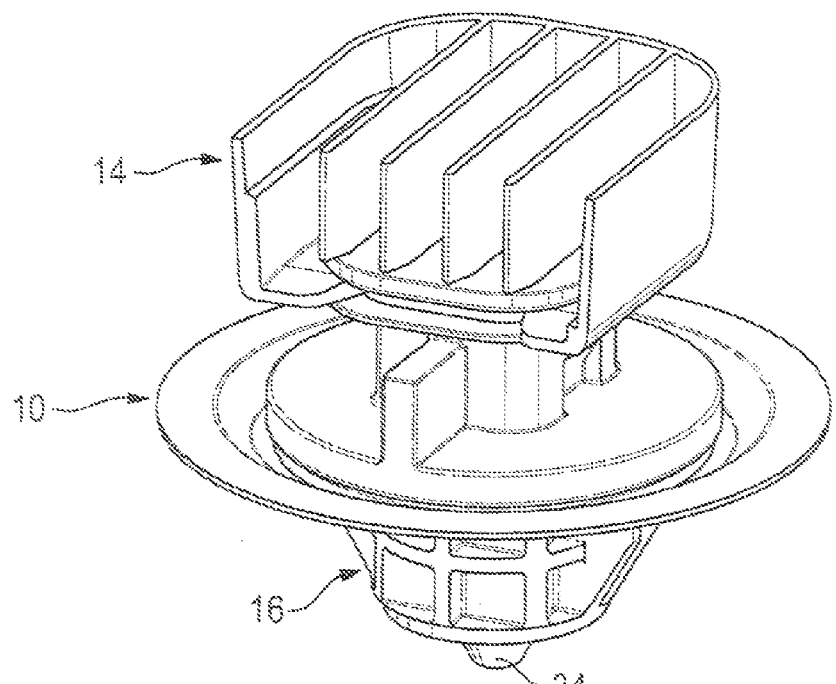
FIG. 5 shows a perspective view of the connecting assembly in the mounting position.
Figure 6:
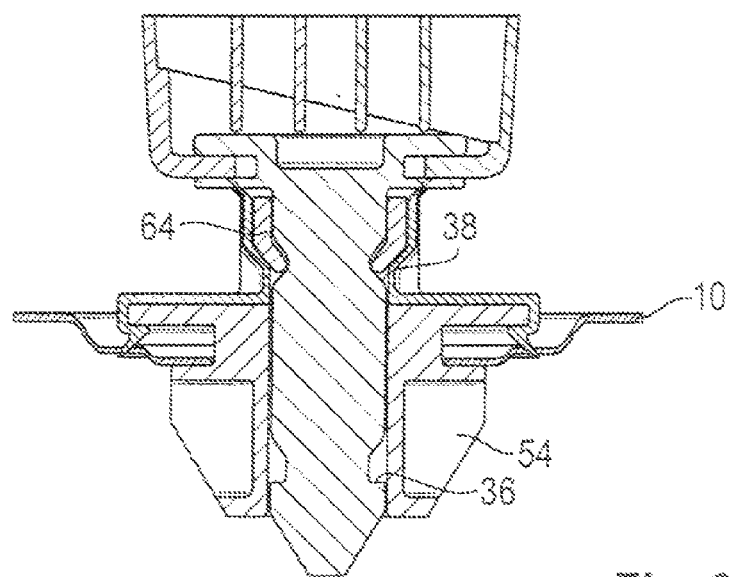
FIG. 6 shows a lateral sectional view of the connecting assembly in the mounting position.
Figure 7:
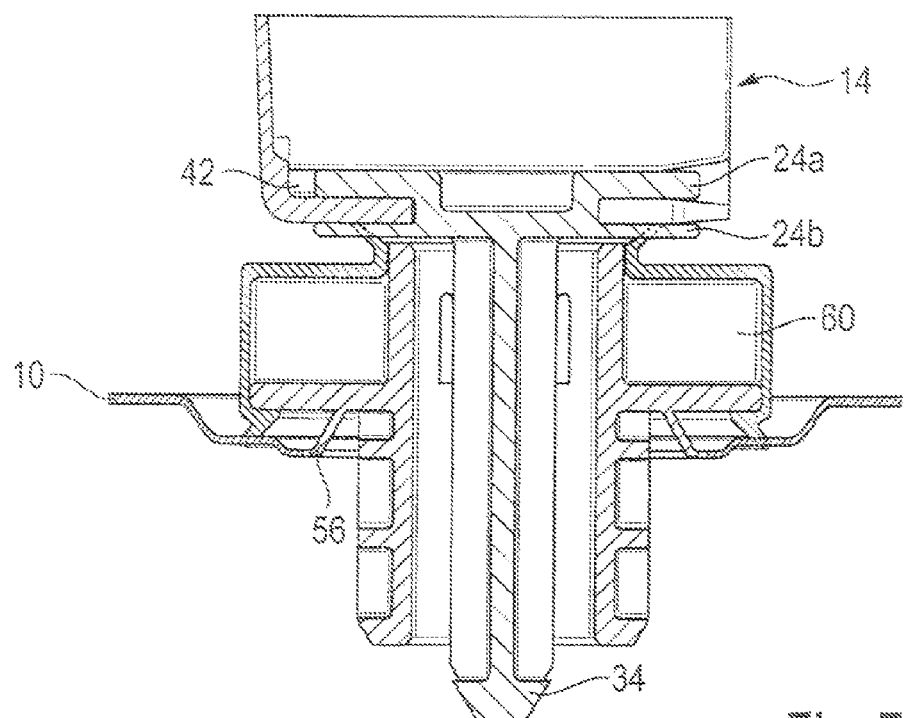
FIG. 7 shows a lateral sectional view, rotated through 90 degrees as compared with FIG. 6, of the connecting assembly in the mounting position.
Figure 8:
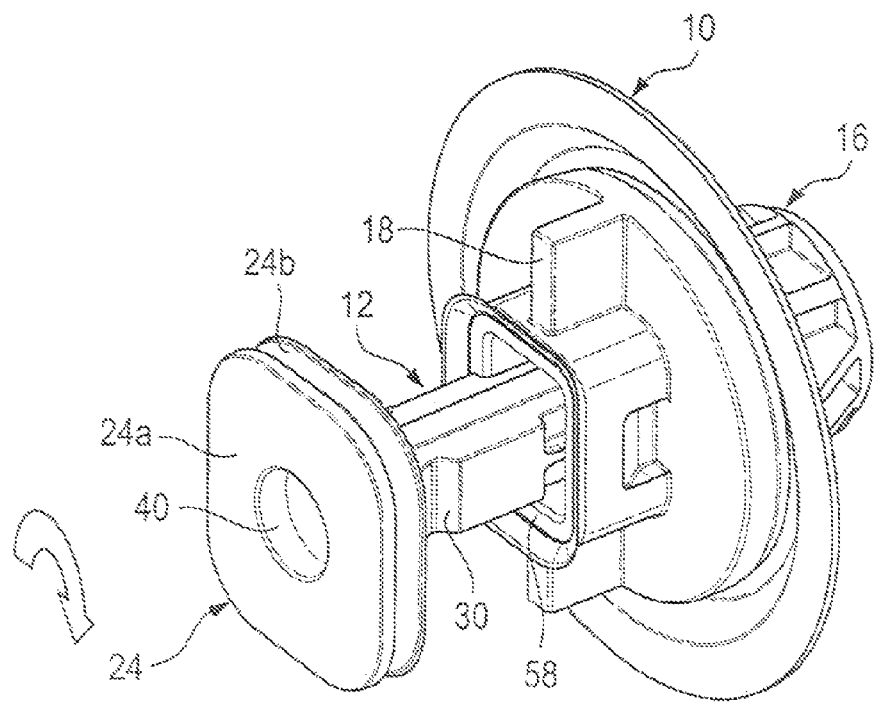
FIG. 8 shows a perspective view of the connecting assembly without the coupling part, in the intermediate position.

The first orientation of the pin 12 relative to the holding clip 16 as prescribed by the orientation prescribing means is selected in such a way that upon insertion of the pin 12 into the guide channel 62 of the holding clip 16, at first the first retaining means 30 of the pin 12 come into engagement with the complementary retaining means 64 of the holding clip 16. This intermediate position of the connecting assembly is shown in FIGS. 3 and 4 and will be described in more detail further below. When the pin 12 is pressed down further in the axial direction, causing the complementary retaining means 64 to be deformed or pivoted, the connecting assembly will assume its final mounting position, which is shown in FIGS. 5, 6 and 7.

In the mounting position the pin 12 will maintain its first orientation, so that the second retaining means 32 of the pin 12 now come into engagement with the complementary retaining means 64 of the holding clip 16 (see in particular FIG. 6) and the lower head part 24b rests on the free upper edge of the second structure 58 of the holding clip 16, which in the illustrated exemplary embodiment is in addition covered by the seal 18. In the mounting position the seal 18 thus also seals the guide channel 62 from the lower head part 24b of the pin 12.

In the mounting position the connection between the add-on element and the carrier 10 is secured against a removal force of approx. 130 N±30 N by the second retaining means 32 of the pin 12 and the complementary retaining means 64 of the holding clip 16 cooperating with each other. As already discussed at the outset, the maximum force which the connecting assembly is able to withstand before the add-on element can no longer be held on the carrier 10 is referred to as the removal force. Because of the sturdy design of the holding means 54 of the holding clip 16, the removal force is determined here by the maximum force directed contrary to the insertion direction of the pin 12 which the pin 12 is able to resist before it can no longer be held by the holding clip 16. The above-mentioned order of magnitude of the removal force ensures a secure connection of a door lining with a door panel under normal vehicle conditions.

In case of larger forces, as may occur in the event of a lateral impact, for example, the ramps 38 press the elastic complementary retaining means 64 aside, so that the pin 12 slides out of the holding clip 16 into the intermediate position. In the intermediate position the complementary retaining means 64 of the holding clip 16 rest against the holding surfaces 36, oriented perpendicularly to the axis A. of the right-angled edges of the first retaining means 30 (see FIG. 4). In the intermediate position the connecting assembly therefore withstands a removal force which amounts to more than 1000 N and, accordingly, is substantially higher than that in the mounting position. This ensures that the add-on element (door lining) can not become completely detached from the carrier 10 (door panel) even under extreme conditions.

It is frequently required to dismount an add-on element again after the first mounting, for example in order to install particular fittings behind the add-on element or to carry out some maintenance work. For this purpose, the add-on element needs to be pulled on "only" with a force that is higher than the maximum removal force which the connecting assembly is able to withstand in the mounting position. The connecting assembly will then move to the intermediate position, in which the coupling part 14, and the add-on element with it, may be withdrawn from the head 24 of the pin 12 without difficulty. In the reverse order, the add-on element may be pushed onto the head 24 of the pin 12 again and the connecting assembly may be transferred to the mounting position again by pressing down fully. The connecting assembly thus allows the add-on element to be removed and subsequently to be perfectly fastened on the carrier 10 again after the first fitting of the add-on element to the carrier 10.

It is also possible to remove the pin 12 from the holding clip 16 later. When the connecting assembly is transferred from the mounting position to the intermediate position and the coupling part 14 is withdrawn from the head 24 of the pin 12 as described above, the head 24 of the pin 12 with the seat 40 is freely accessible. Turning the head 24 to the second orientation of the pin (turning it through 90 degrees here), optionally with the aid of a screwdriving tool introduced into the seat 40, will cause the first retaining means 30 of the pin 12 to move out of engagement with the complementary retaining means 64 of the holding clip 16. In its second orientation, the pin 12 may thus be removed from the holding clip 16 without difficulty. Renewed mounting is effected like the first mounting.

It is apparent from the above functional description that the first and second retaining means 30, 32 may also be provided on the holding clip 16 and the complementary retaining means 64 may also be provided on the pin 12, without this changing the fundamental qualities of the connecting assembly.

In the case of application of the fastening of a door lining to a door panel, it is sufficient to provide only one or a few connecting assemblies of the above-described type at critical places. Simple trim clip connections may be provided at other connecting points, such connections needing to withstand only small removal forces (on the order of 130 N). In such trim clip connections shorter pins may be used, which are already in a completely removed state when the above-described connecting assembly has only reached the intermediate position.

The invention claimed is:
1. A connecting assembly for fastening an add-on element on a carrier (10), comprising
   a holding clip (16) which can be inserted into a mounting opening (20) of the carrier (10) and includes holding means (54) for axially locating the holding clip (16) on the carrier (10), and
   a pin (12) which can be reversibly fitted to a coupling part (14) fastened to the add-on element and can be inserted into the holding clip (16), the removal force of the pin (12) being larger in an intermediate position of the connecting assembly, in which the pin (12) has a first orientation relative to the holding clip (16) and is not completely inserted in the holding clip (16), than in a mounting position of the connecting assembly, in which the pin (12) likewise has the first orientation and is completely inserted in the holding clip (16), the pin (12) including first retaining means (30) formed as undercuts having holding surfaces (36) that are oriented substantially perpendicularly to a longitudinal axis (A) of the pin (12), the first retaining means (30) in the intermediate position cooperating with complementary retaining means (64) of the holding clip (16), wherein in the intermediate position the pin (12) is transferred to a second orientation having a different angle of rotation relative to the longitudinal axis (A) of the pin (12) than the first orientation such that the first retaining means (30) ceases cooperation with the complementary retaining means (64) when transferred from the first orientation to the second orientation, rotation of the pin (12) relative to the holding clip (16) when the pin is in the intermediate position causing the first retaining means (30) of the pin (12) to move out of engagement with the retaining means (64) of the holding clip (16) to allow for removal of the pin (12) from the holding clip (16), the pin (12) including second retaining means (32) having upper and lower ramps (38) that converge towards one another in a direction extending towards the longitudinal axis (A) of the pin (12) to form notches, the notches of the second retaining means (32) in the mounting position cooperating with the complementary retaining means (64) of the holding clip (16).

2. The connecting assembly according to claim 1, wherein the complementary retaining means (64) are formed as latching projections.

3. The connecting assembly according to claim 1, wherein the pin (12) and the coupling part (14) include orientation prescribing means that match each other and prescribe a specific orientation of the pin (12).

4. The connecting assembly according to claim 3, wherein the pin (12) has a head (24) and the coupling part (14) has a pocket (42) for receiving at least a portion of the head (24), and the orientation prescribing means of the pin (12) and of the coupling part (14) are formed by shaped portions of the head (24) and of the pocket (42) matching each other.

5. The connecting assembly according to claim 1, wherein the holding means (54) of the holding clip (16) are formed by radially protruding structural sections that are axially spaced apart from a flange (50) and are adjusted to extensions (22) of the mounting opening (20) such that the holding clip (16) can only be inserted into the mounting opening (20) in a first orientation.

6. The connecting assembly according to claim 5, wherein after insertion into the mounting opening (20) of the carrier (10), the holding clip (16) is transferred to a second orientation in which the holding means (54) axially locate the holding clip (16) on the carrier (10).

7. The connecting assembly according to claim 6, wherein the holding clip (16) and the carrier (10) include orientation prescribing means (22, 56) that match each other and prescribe the second orientation of the holding clip (16).

8. The connecting assembly according to claim 7, wherein the orientation prescribing means of the holding clip (16) and of the carrier (10) are formed by latching tongues (56) of the holding clip (16) which engage into complementary recesses (22) of the carrier (10).

9. The connecting assembly according to claim 1, wherein a seal (18) which is preassembled on or integrally injection-molded with the holding clip (16) and seals off the mounting opening (20) and/or a guide channel (64) of the holding clip (16) into which the pin (12) can be inserted.

10. The connecting assembly according to claim 1, wherein the retaining means of the holding clip have a collapsed condition when the pin is in the intermediate position, the retaining means of the holding clip pivoting radially outward relative to the longitudinal axis to an expanded condition when the pin moves from the intermediate position toward the mounting position, the retaining means pivoting radially inward relative to the longitudinal axis to the collapsed condition when the pin reaches the mounting position.

* * * * *